United States Patent
Casazza (10) Patent No.: US 7,386,672 B2
(45) Date of Patent: Jun. 10, 2008

(54) APPARATUS AND METHOD FOR PROVIDING GLOBAL SESSION PERSISTENCE

(75) Inventor: James Casazza, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 966 days.

(21) Appl. No.: 10/231,678

(22) Filed: Aug. 29, 2002

(65) Prior Publication Data

US 2004/0044866 A1   Mar. 4, 2004

(51) Int. Cl.
*G06F 12/00* (2006.01)
(52) U.S. Cl. .......................... 711/129; 707/9; 711/163
(58) Field of Classification Search ................ 345/733, 345/741, 557; 707/9; 709/213, 312; 711/126, 711/129, 130, 133, 134, 135, 156, 163, 166; 713/151, 153, 166, 182, 200
See application file for complete search history.

(56) References Cited

U.S. PATENT DOCUMENTS

| | | | | |
|---|---|---|---|---|
| 5,649,139 A | * | 7/1997 | Weinreb et al. ............. | 711/202 |
| 5,974,438 A | * | 10/1999 | Neufeld ....................... | 718/104 |
| 6,675,261 B2 | * | 1/2004 | Shandony .................... | 711/121 |
| 2002/0062424 A1 | * | 5/2002 | Liao et al. ................... | 711/129 |
| 2002/0091702 A1 | * | 7/2002 | Mullins ....................... | 707/100 |

* cited by examiner

*Primary Examiner*—Doanld Sparks
*Assistant Examiner*—Matthew Bradley
(74) *Attorney, Agent, or Firm*—Martin & Associates, LLC; Derek P. Martin (57) ABSTRACT

An apparatus and method provide persistent data during a user session on a networked computer system. A global data cache is divided into three sections: trusted, protected, and unprotected. An authorization mechanism stores and retrieves authorization data from the trusted section of the global data store. A common session manager stores and retrieves data from the protected and unprotected sections of the global data cache. Using the authorization mechanism, software applications may verify that a user is authorized without prompting the user for authorization information. Using the common session manager, software applications may store and retrieve data to and from the global data store, allowing the sharing of data during a user session. After the user session terminates, the data in the global data cache corresponding to the user session is invalidated.

3 Claims, 10 Drawing Sheets

APPARATUS AND METHOD FOR PROVIDING GLOBAL SESSION PERSISTENCE

BACKGROUND OF THE INVENTION

1. Technical Field

This invention generally relates to computer systems, and more specifically relates to apparatus and methods for sharing information between computer systems.

2. Background Art

Since the dawn of the computer age, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users and software applications to communicate with each other over the network. One network that has become very popular is the Internet.

A web site may be comprised of many different computer systems that cooperate to provide the impression of a single computer system that serves up the requested pages as a user browses the web site. For example, IBM has a domain at http://www.ibm.com that is made up of many different computer systems at many different locations. One portion of the IBM web site may be for public use, another for use by vendors or business partners, and yet another for use by employees.

Due to security concerns, many web sites require a user to enter a user name and password before allowing the user to access a portion of the web site. When a web site is made up of different computer systems that have different authentication and authorization systems, the user may be prompted multiple times to enter a user name and password. Needless to say, when a user clicks on a link that is still in the same domain, the user will likely be frustrated at having to repeatedly enter the same authorization information before being allowed to access different portions of the site.

IBM has solved the problem of being prompted multiple times with a single sign-on (SSO) system that provides a common mechanism for compatible programs to access previously-entered security information rather than prompting the user for the information each time it is needed. However, the single sign-on system requires that each application be compatible with the common security mechanism, making it unusable in many situations where incompatible applications are running.

Another problem that exists in networked computer systems is the need to share information between software applications during a user session. If application A needs to access data produced by application B, the most common way to share the information between the applications is to design an interface that allows the two to communicate. This requires modification of both applications, and results in a custom interface that may not be suitable for communication between other applications. The result is a custom solution that must be replicated for each set of applications that need to communicate with each other. Of course, data could be stored in a central database that different applications could access. However, data in a central database would survive beyond the current user session, and would therefore not be practical for data that need only be maintained during a user session. Without a mechanism and method that provides globally persistent data that may be shared between applications during a user session, and that is invalidated when the user session terminates, the computer industry will continue to suffer from inefficient methods for sharing information between software applications.

DISCLOSURE OF INVENTION

According to the preferred embodiments, an apparatus and method provide persistent data during a user session on a networked computer system. A global data cache is divided into three sections: trusted, protected, and unprotected. An authorization mechanism stores and retrieves authorization data from the trusted section of the global data store. A common session manager stores and retrieves data from the protected and unprotected sections of the global data cache. Using the authorization mechanism, software applications may verify that a user is authorized without prompting the user for authorization information. Using the common session manager, software applications may store and retrieve data to and from the global data store, allowing the sharing of data during a user session. After the user session terminates, the data in the global data cache corresponding to the user session is invalidated.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention allows for easily sharing data between software applications during a user session by providing a global data cache for storing the information, and by providing an authorization mechanism interface for authorizing users and by providing a common session manager interface for storing and retrieving data stored in the global data cache by different software applications. The present invention provides single sign-on capability along with the ability to share any data between software applications using a simple and common interface.

Figure 3:
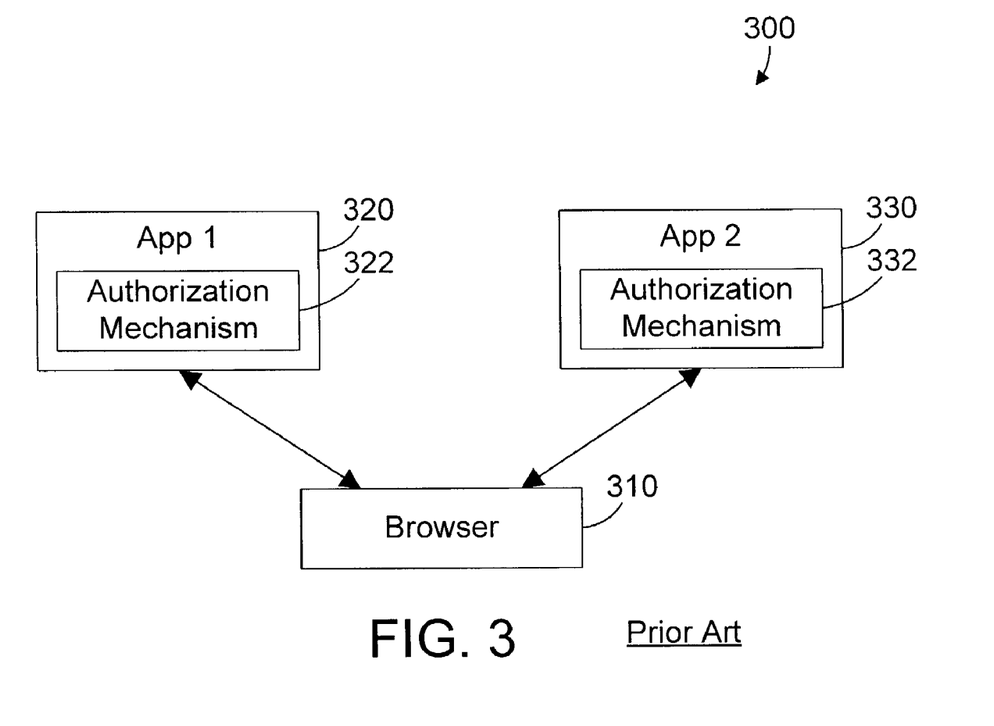
FIG. 3 is a block diagram of a prior art networked computer system.

In the early days of computer networks, it was common for each software application to have its own authorization mechanism, as shown in FIG. 3. A first application 320 includes an authorization mechanism 322, while a second application 330 includes a separate authorization mechanism 332 that may be different from the authorization mechanism 322. A user accesses the applications 320 and 330 using a browser 310. When the user accesses the first application 320, the authorization mechanism 322 prompts the user for authorization information, such as a user name and password. When the user accesses the second application 330, the authorization mechanism 332 again prompts the user for authorization information. Note that the authorization information for each application 320 and 330 may be different. The primary drawback of system 300 in FIG. 3 is that each application prompts the user to input authorization information before allowing the user access to the application.

As computer networks evolved, some systems recognized the desirability of having a single user name and password that would work for a number of different software applications. In this case, the authorization mechanisms 322 and 332 could access a common authorization mechanism that provides a single username and password. Note, however, that the authorization mechanisms 322 and 332 still must prompt the user for the authorization information, and will then check the user-supplied authorization information against information stored in the common authorization mechanism. The result is a system that repeatedly prompts the user for the same authorization information, which is time-consuming and annoying to users.

Figure 4:
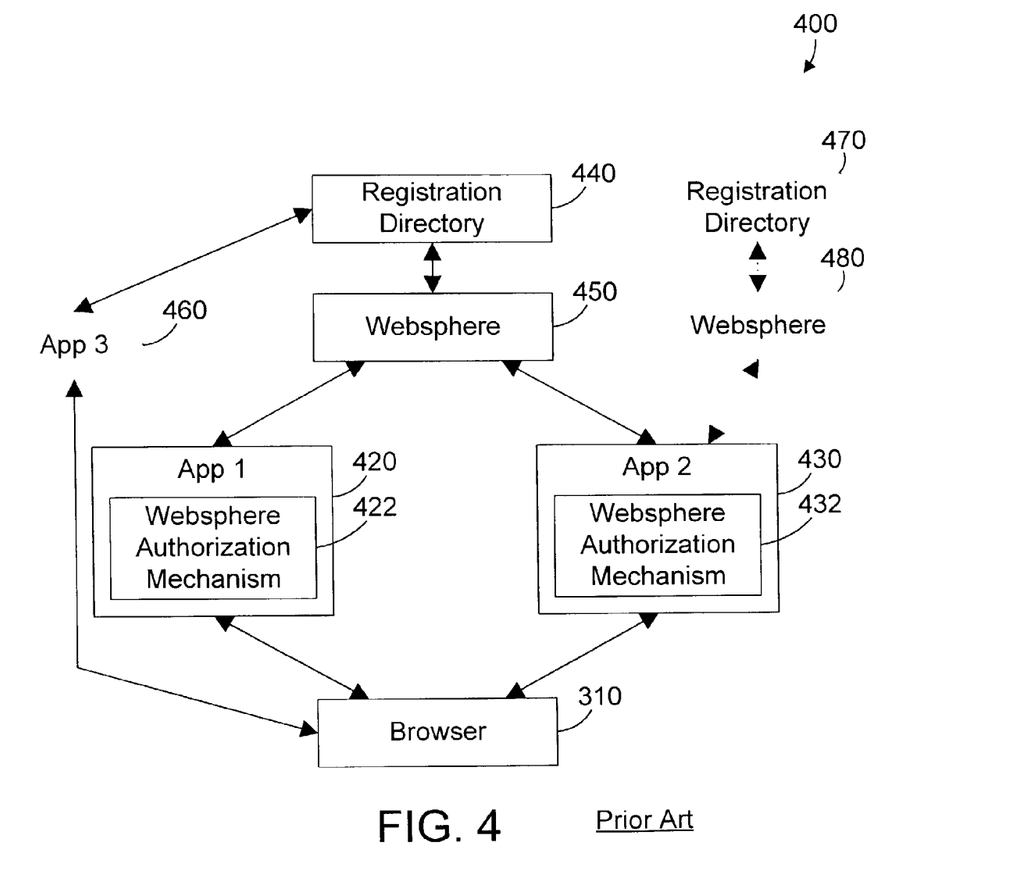
FIG. 4 is a block diagram of another prior art networked computer system.

IBM recognized the need for a computer system that allows users to sign on once, allowing software applications to independently verify that the user has been previously authorized. One simple example of a single sign-on system is shown in FIG. 4. Websphere 450 is a computer program developed and marketed by IBM that allows single sign-on capability. Websphere 450 is coupled to registration directory 440, which provides a directory of authorization information for users. Websphere 450 provide an interface for websphere-compatible applications (such as applications 420 and 430) to verify whether or not a user has been previously authorized. Each application 420 and 430 includes a corresponding websphere authorization mechanism, 422 and 432, respectively. A user runs a browser 310 through which the user requests access to applications 420 and 430.

The IBM Websphere system 400 shown in FIG. 4 works great for computer systems that have a single authorization mechanism (such as Websphere 450 and registration directory 440), and that have applications that are all compatible with Websphere (i.e., that have a corresponding Websphere authorization mechanism). Websphere is written in the Java programming language developed by Sun Microsystems. Applications written in other languages, such as C++ or Perl, do not have a websphere-compatible authorization mechanism. As a result, non-Websphere applications may access registration directory 440 directly, as shown by application 460 in phantom in FIG. 4. Note, however, that bypassing Websphere 450 as shown by application 460 destroys the single sing-on capability in the system, because Websphere 450 does not communicate with application 460. As a result, if the user accesses application 420, then accesses application 460, the user will still have to enter authorization information for application 460, because any authorization information previously-entered via Websphere 450 will be unavailable to application 460. In addition, Websphere is coupled to a single registration directory. Thus, if different authorization systems are used, there will have to be a separate Websphere instance running for each authorization system, as shown in phantom in FIG. 4 for registration directory 470 and Websphere 480. This could well be the case if there are different authorization systems for internal users (such as IBM employees) and external users (such as the general public). What is lacking in the prior art is the ability to provide single sign-on capability across software applications written in different languages, the ability to easily interface to multiple authorization mechanisms, if needed, and the ability to share information between software applications during a user session. These deficiencies in the prior art are overcome by the present invention. A description of the preferred embodiments now follows.

Figure 1:
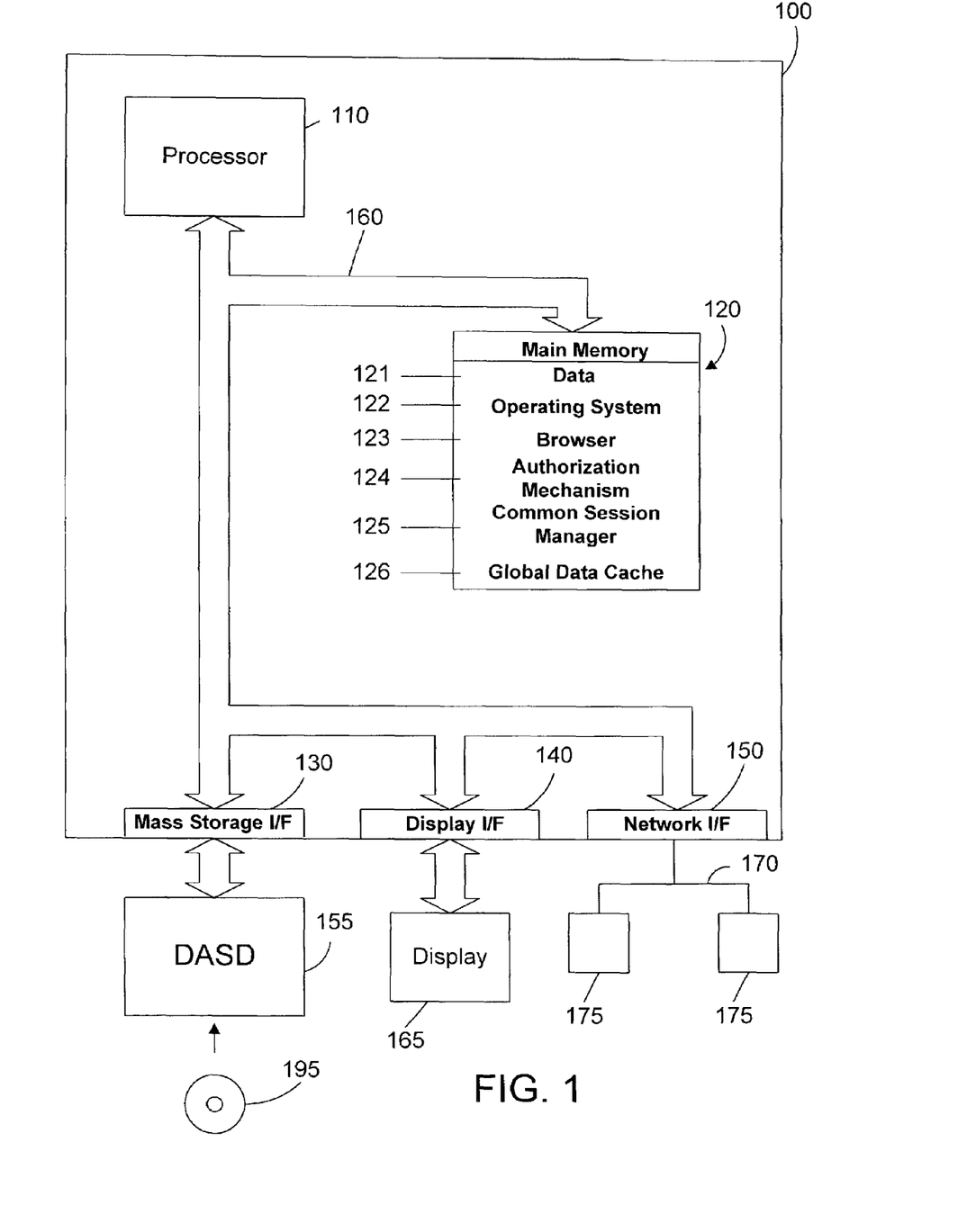
FIG. 1 is a block diagram of an apparatus in accordance with the preferred embodiments.

Referring to FIG. 1, a computer system 100 is one suitable implementation of an apparatus in accordance with the preferred embodiments of the invention. Computer system 100 is an IBM iSeries computer system. However, those skilled in the art will appreciate that the mechanisms and apparatus of the present invention apply equally to any computer system, regardless of whether the computer system is a complicated multiuser computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices (such as a direct access storage device 155) to computer system 100. One specific type of direct access storage device 155 is a readable and writable CD ROM drive, which may store data to and read data from a CD ROM 195.

Main memory 120 in accordance with the preferred embodiments contains data 121, an operating system 122, a browser 123, an authorization mechanism 124, a common session manager 125, and a global data cache 126. Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Browser 123 is a software application that provides a user interface for a user to access one or more other software applications. Examples of commercially-available browsers include Microsoft Internet Explorer and Netscape Communicator. Authorization mechanism 124 is an interface that provides single sign-on capability for applications a user may access during a user session. Common session manager 125 is an interface that allows applications to store information in the global data cache 126 and to retrieve information from the global data cache 126. Global data cache 126 is a memory that maintains data during a user session. One of the key features of global data cache 126 is that the contents that relate to a specific user session are invalidated once the user session is no longer active.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, browser 123, authorization mechanism 124, common session manager 125, and global data cache 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer-readable signal bearing media include: recordable type media such as floppy disks and CD ROM (e.g., 195 of FIG. 1), and transmission type media such as digital and analog communications links.

Figure 2:
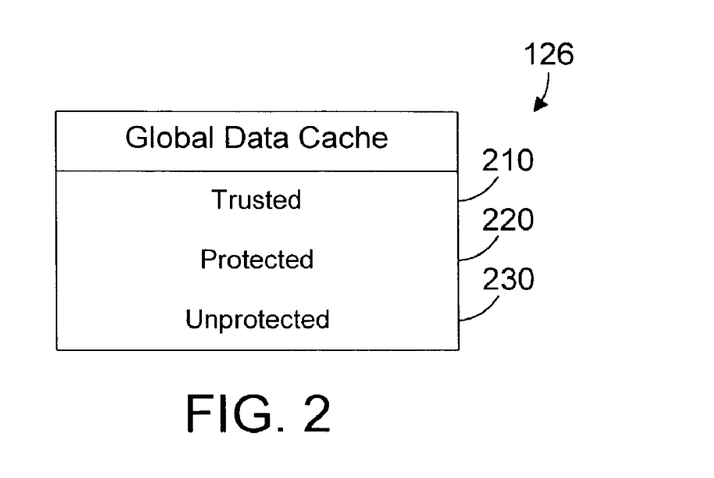
FIG. 2 is a block diagram showing one suitable configuration in accordance with the preferred embodiments for the global data cache shown in FIG. 1.

Referring to FIG. 2, the global data cache 126 in FIG. 1 is preferably divided into multiple sections (or areas). In the preferred embodiments, global data cache 126 includes a trusted section 210, a protected section 220, and an unprotected section 230. Trusted section 210 includes user authorization information. Protected section 220 includes information that may be accessed by other applications if their user is properly authorized. Unprotected section 230 includes information that may be accessed by any application that has a valid session identifier. By providing multiple sections within the global data cache, data may be stored in the sections according to the security requirements for allowing access to the data.

Figure 5:
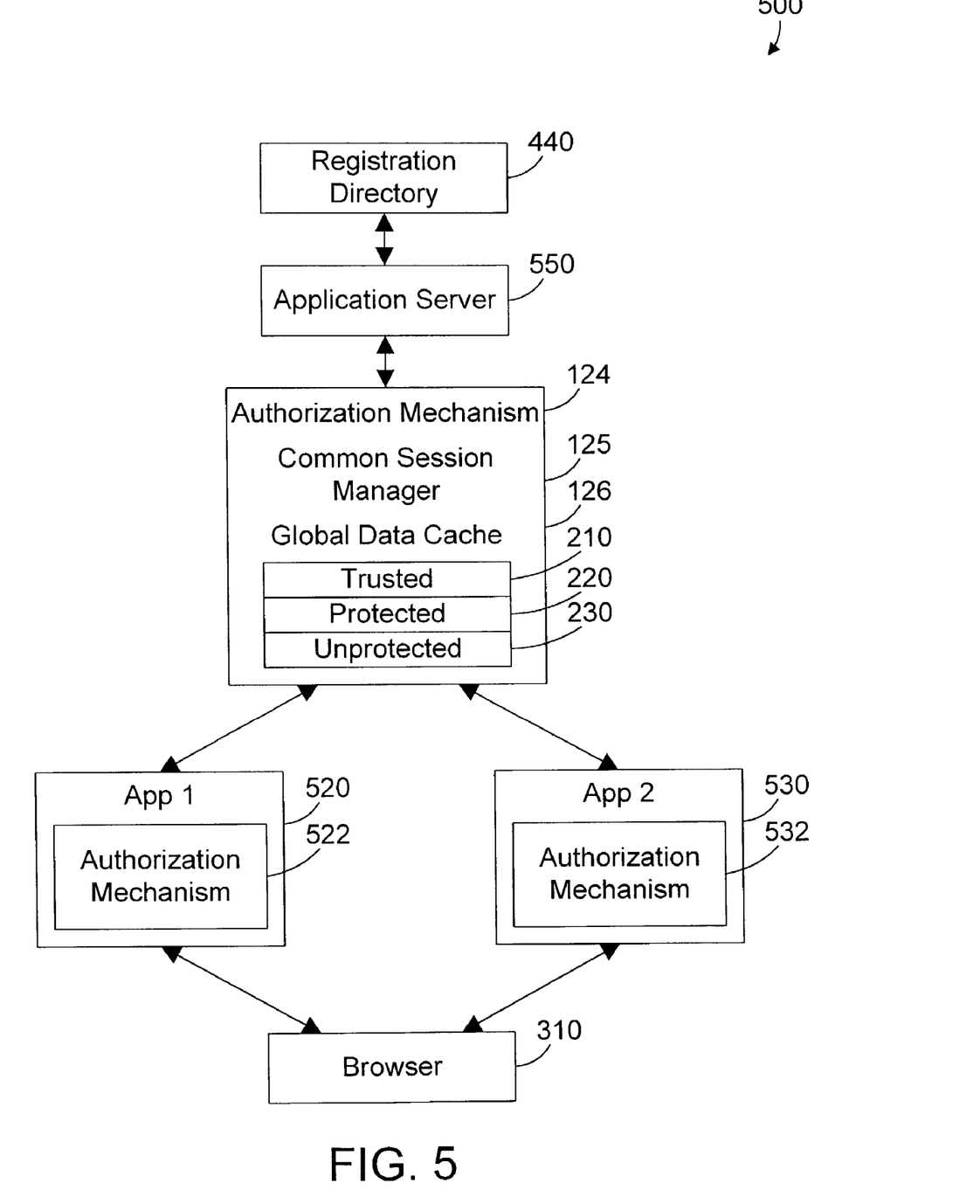
FIG. 5 is a block diagram of a networked computer system in accordance with the preferred embodiments that provides a global data cache that can contain both user authorization data and application data that needs to be shared among applications.

Referring now to FIG. 5, a networked computer system 500 in accordance with the preferred embodiments includes a browser 310 that communicates with software applications 520 and 530. Each software application 520 and 530 has a corresponding authorization mechanism 522 and 532, respectively. The authorization mechanisms 522 and 532 communicate with an authorization mechanism 124 that provides single sign-on capability for all compatible applications. A common session manager 125 provides an interface for applications 520 and 530 to share information during a user session. The global data cache 126 includes a trusted section 210, a protected section 220, and an unprotected section 230, as also shown in FIG. 2. Authorization mechanism 124 is coupled to any suitable authorization system, shown by way of example as application server 550 and registration directory 440 in FIG. 5. One example of a suitable application server 550 is IBM's Websphere. One example of a suitable registration directory 440 is a lightweight directory access protocol (LDAP) directory.

Figure 6:
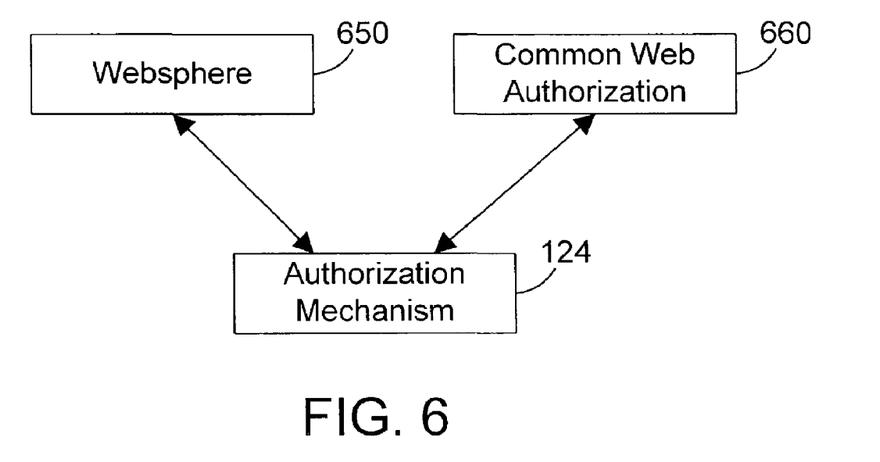
FIG. 6 is a block diagram showing that the authorization mechanism of FIG. 5 may communication with more than one system for verifying user authorization.

A significant advantage of the authorization mechanism 124 over the prior art is that it may communicate with multiple authorization systems. One example of this is shown in FIG. 6, where the authorization mechanism 124 communicates with Websphere 650 for authorization of some users (such as employees), and communicates with another authorization system such as a common web authorization mechanism 660 for other users (such as the general public). Because authorization mechanism 124 may communicate with multiple authorization systems, there is no need for each application to be able to communicate with each authorization system, as shown in the prior art system 400 in FIG. 4. When multiple authorization systems are involved, the user will still be required to log into each system. However, data may still be shared between applications that use different authorization systems via the global data cache.

Figure 7:
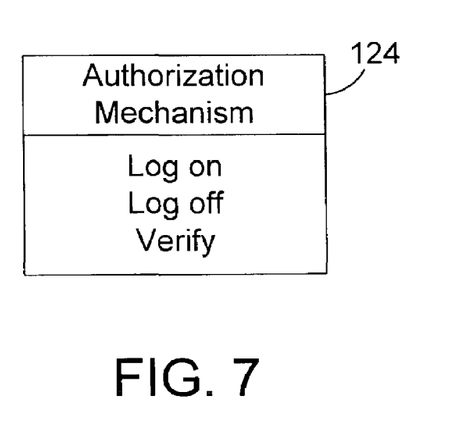
FIG. 7 is a block diagram showing functions provided by the authorization mechanism in accordance with the preferred embodiments.

Authorization mechanism 124 provides an interface for applications to perform authorization functions for a user. Suitable authorization functions within the scope of the preferred embodiments are shown in FIG. 7 to include a log on function, a log off function, and a verify function. The log on function is provided to log a user into the authorization mechanism 124 by a software application. The log off function is provided to log a user off from authorization mechanism 124 by a software application. The verify function allows a software application to determine whether a user has been previously authorized (or logged in) to the authorization mechanism 124.

Figure 8:
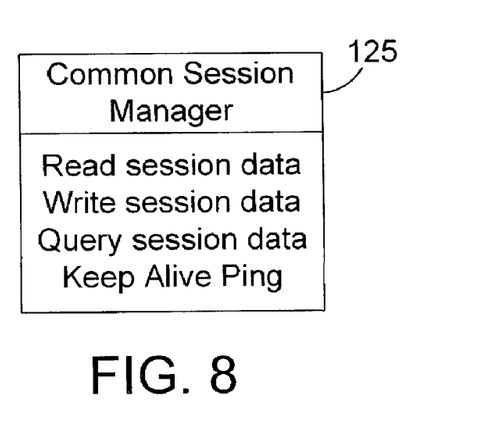
FIG. 8 is a block diagram showing functions provided by the common session manager in accordance with the preferred embodiments.

Common session manager 125 provides an interface for software applications to share data with each other during a user session. Suitable functions for the common session manager 125 within the scope of the preferred embodiments are shown in FIG. 8 to include a read session data function, a write session data function, a query session data function, and a keep alive ping function. The read session data function reads data that corresponds to the user session that is stored in the global data cache. The write session data function writes data that corresponds to the user session to the global data cache. In the preferred embodiments, data corresponding to the user session is stored in the global data cache as an object. The query session data function allows querying data that corresponds to the user session in the global data cache. The query session data function also allows an application to determine what data is stored in the global data cache. The keep alive ping function is used to notify or "ping" the common session manager so the common session manager does not time out when an application is busy. By invoking the keep alive ping function, a software application can keep a user session alive while the application is busy performing other tasks.

Figure 9:
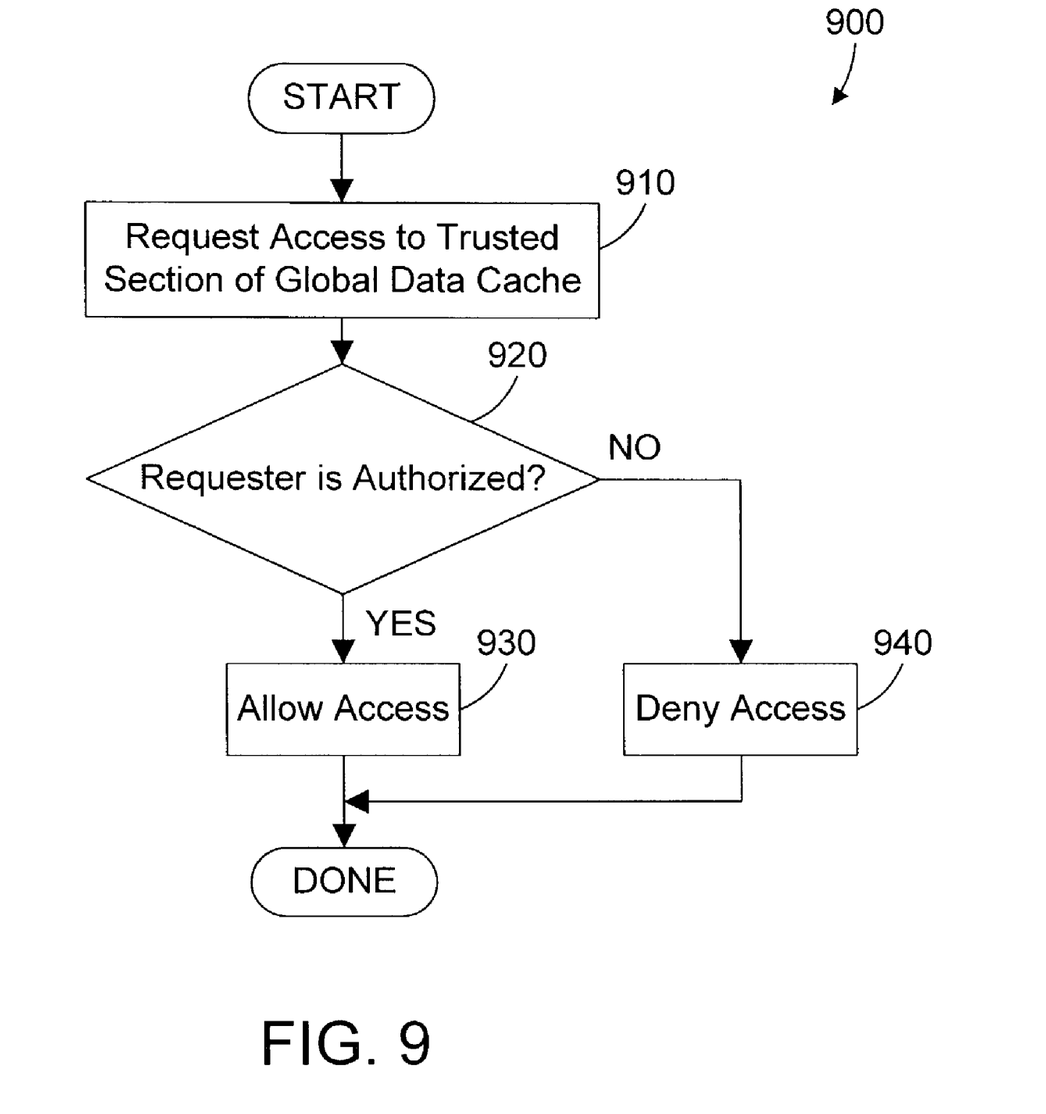
FIG. 9 is a flow diagram of a method for accessing data in the trusted section of the global data cache.
Figure 10:
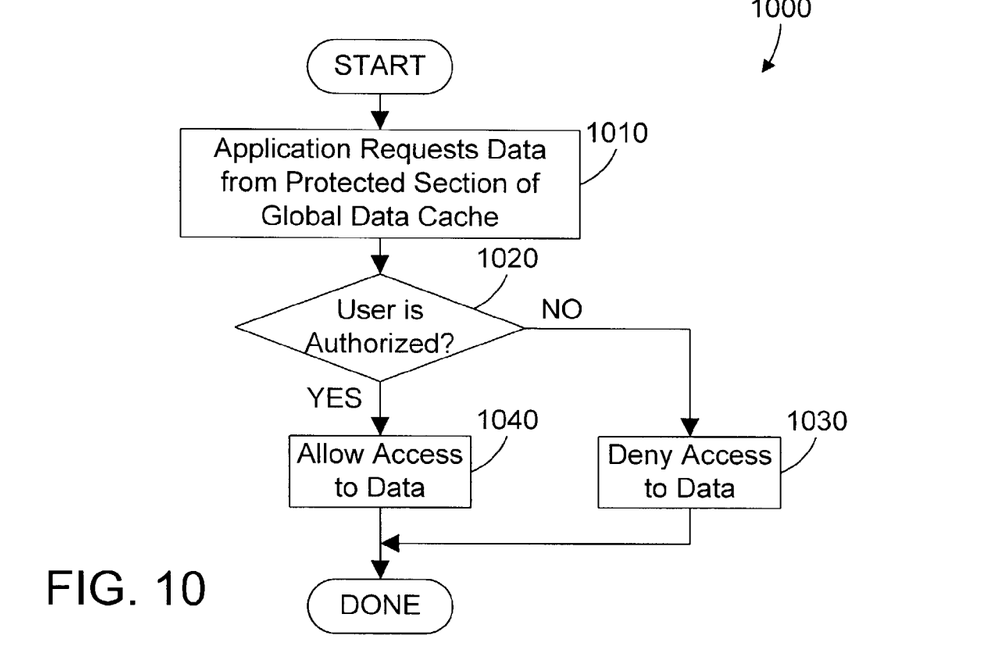
FIG. 10 is a flow diagram of a method for accessing data in the protected section of the global data cache.
Figure 11:
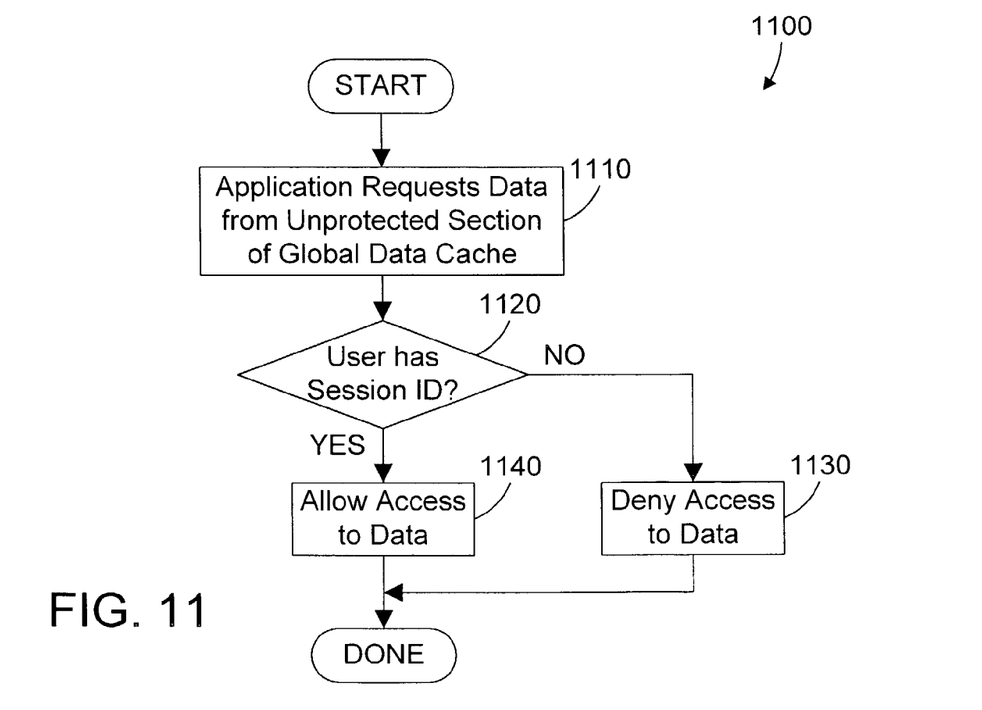
FIG. 11 is a flow diagram of a method for accessing data in the unprotected section of the global data cache.

The three sections 210, 220 and 230 of the global data cache 126 are shown in FIGS. 2 and 5. One difference between the sections is the determination of whether an application is authorized to access each section. Methods for accessing the three different sections are shown in FIGS. 9-11. FIG. 9 shows a method 900 for accessing data in the trusted section 210 of the global data cache 126. Method 900 begins when the trusted section 210 of the global data cache 126 needs to be accessed (step 910). In the preferred embodiments, the authorization mechanism 124 is the interface for accessing the trusted section 210. Authorization mechanism 124 thus may store authorization information relating to the user and user session in the trusted section 210, or may verify that an application is authorized to access the trusted section 210 directly. Thus, if the requester in step 910 is authorized to access the trusted section (step 920=YES), the requester is allowed to access the trusted section (step 930). If the requester in step 910 is not authorized to access the trusted section (step 920=NO), the requester is denied access to the trusted section (step 940). Method 900 thus assures that only properly authorized applications may access the trusted section 210 of the global data cache 126. Note that an access to the trusted section could be either a read operation, a write operation, or a combination of these operations. Also note that applications may include authorization mechanisms that can store authorization information directly into the trusted section of the global data cache once verified by the authorization mechanism 124 as being authorized to do so.

Referring now to FIG. 10, a method 1000 for accessing data in the protected section of the global data cache begins when an application requests data from the protected section (step 1010). In response, step 1020 determines whether the user is authorized to access the data. In the preferred embodiments, the user's session ID and authorization credentials are both verified. Note, however, that if the user has already logged in to the authorization mechanism 124, method 1000 may determine whether the user is authorized in step 1020 by simply invoking the verify function on the authorization mechanism 124. If the user that invoked the application is not authorized to access the requested data (step 1020=NO), access to the data is denied (step 1030). If the user that invoked the application is authorized to access the requested data (step 1020=YES), the application is allowed to access the data in the protected section 220 of the global data cache 126. Examples of data that may be stored in the protected section of the global data cache include a user's personal information (e.g., name, address, phone number), a user's computer configuration, order information, and form entry information.

Referring now to FIG. 11, a method 1100 for accessing data in the unprotected section of the global data cache begins when an application requests data from the unprotected section (step 1110). In response, step 1120 determines whether the user has a valid session identifier (step 1120). If the user that invoked the application does not have a valid session identifier (step 1120=NO), access to the data is denied (step 1130). If the user that invoked the application has a valid session identifier (step 1120=YES), the application is allowed to access the data in the unprotected section 230 of the global data cache 126. Examples of data that may be stored in the unprotected section of the global data cache include statistics relating to the number of hits on a web site and a trace showing a history of user activity on the browser.

We see from the methods in FIGS. 9-11 that varying degrees of security are provided for the different sections of the global data cache. While three sections are shown herein by way of illustration, the preferred embodiments expressly extend to any number of sections in a global data cache with any suitable authentication or authorization methods for restricting access to data stored in the global data cache.

In the preferred embodiments, there may be another level of security in the global data cache. Each object stored in the global data cache may specify access permissions by various applications. For such objects, applications will have to pass application-specific authorization information (such as an application identifier and password) each time the application reads the object from or writes the object to the global data cache. Objects may thus specify read and write access to different applications, or to all applications. Thus, an object may specify that all applications may read the object, but the applications that can write the object may be limited. Providing this additional level of security helps to ensure that data stored in the global data cache is not destroyed by an application misusing the objects.

Figure 12:
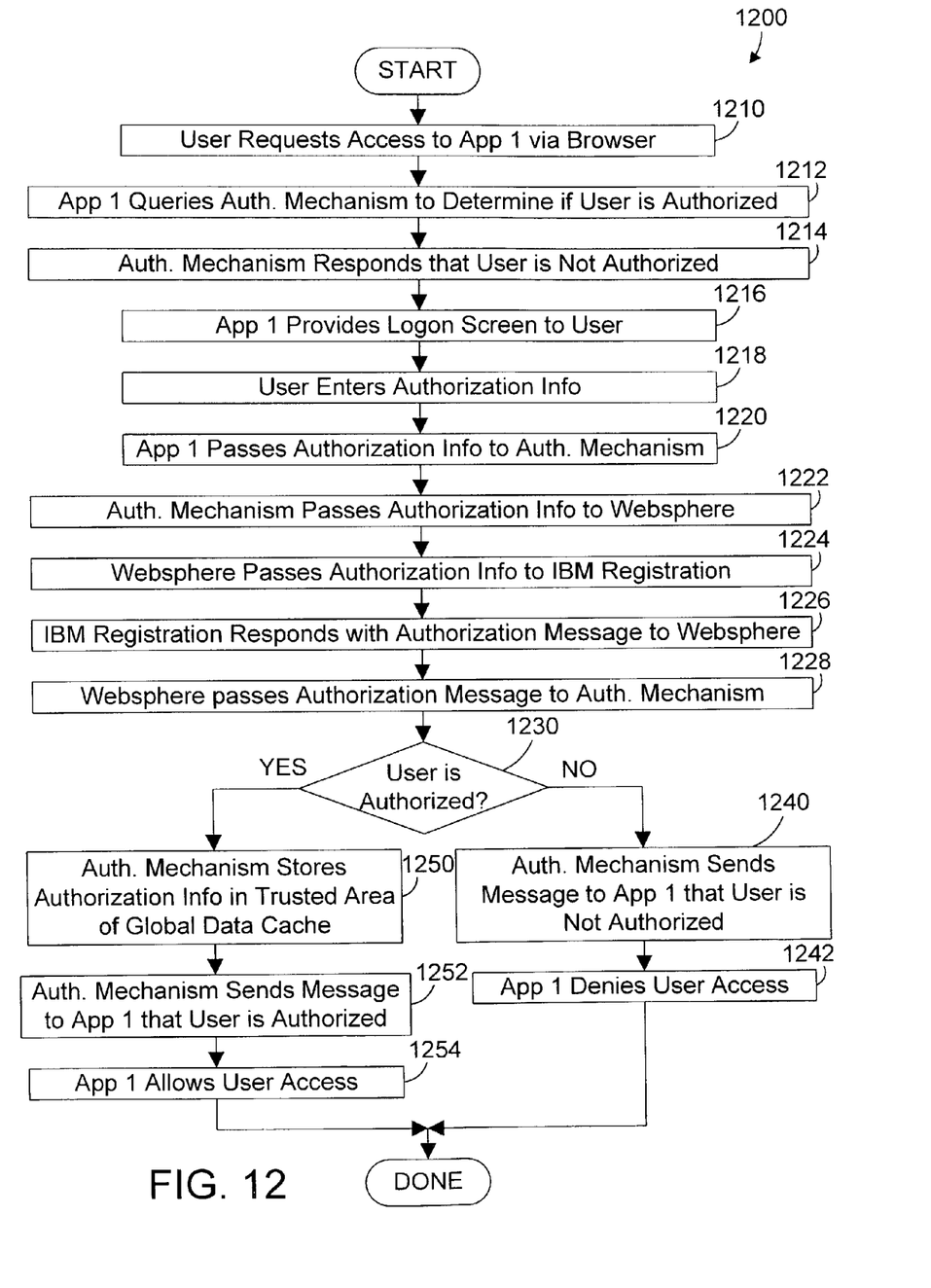
FIG. 12 is a flow diagram of a method in accordance with the preferred embodiments for a first software application to authorize a user for the first time.

Method 1200 of FIG. 12 is a detailed method that shows the steps performed in the system 500 of FIG. 5 when a user requests access to an application for the first time. Note that method 1200 assumes that application server 550 is IBM's Websphere application server. First, we assume that the user requests access to an application 520 via a browser 310 (step 1210). The application queries the authorization mechanism 124 to determine if the user is authorized (step 1212). The query may be performed using the verify function of the authorization mechanism 124. We assume that this is the first time the user has accessed either application 520 or 530 in FIG. 5, so the authorization mechanism 124 responds that the user is not authorized (step 1214). The application 520 then provides a logon screen to the user (step 1216). The user enters his or her authorization information into the logon screen, typically comprising a user name and password, then submits this authorization information (step 1218). The application 520 then attempts to log on to the authorization mechanism 124 by invoking the log on function and passing the user's authorization information as a parameter to the call (step 1220). The authorization mechanism passes the user authorization information to Websphere (step 1222), which then passes the authorization information to registration directory 440 (step 1224). Note that at any point along the path, the authorization information may be encrypted, decrypted, or otherwise processed to a different form. Registration directory 440 determines whether there is an entry for the user that corresponds to the authorization information entered by the user, and returns a message to Websphere (step 1226). If the user is authorized, Websphere then creates an encrypted token that is passed to the authorization mechanism 124 (step 1228). If the user is not authorized, Websphere passes an error message to the authorization mechanism indicating that the user is not authorized. If the user is not authorized (step 1230=NO), the authorization mechanism sends a message to the application indicating that the user is not authorized (step 1240). As a result, the application denies access to the user (step 1242). If the user is authorized (step 1230=YES), the authorization mechanism stores the authorization information in the trusted section of the global data cache (step 1250). The authorization mechanism then sends a message to the application indicating that the user is authorized (step 1252). The user is then allowed to access the application (step 1254).

Figure 13:
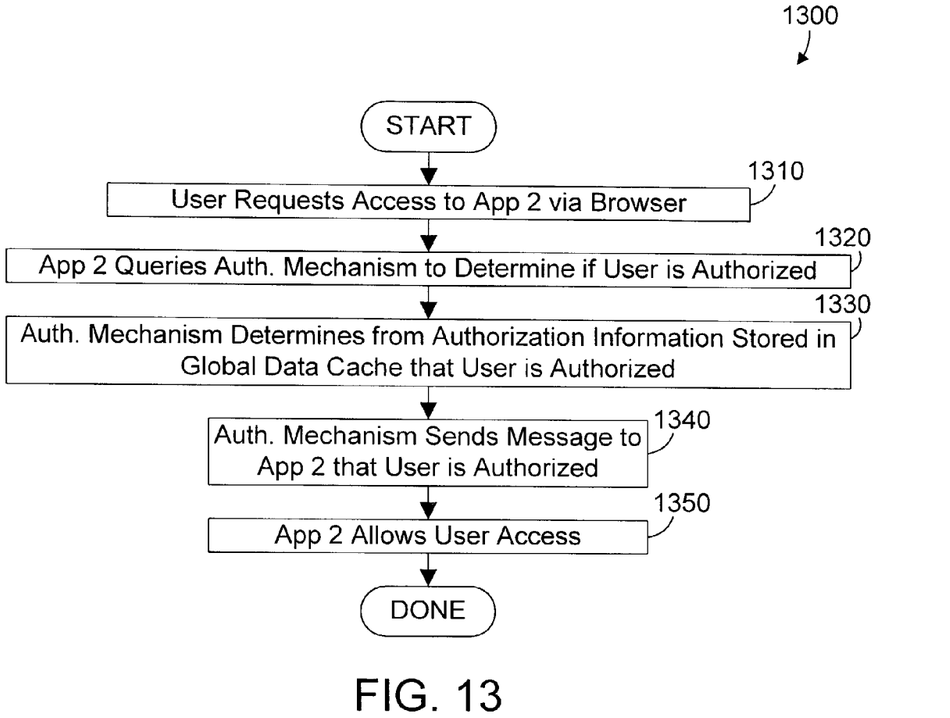
FIG. 13 is a flow diagram of a method in accordance with the preferred embodiments for a second software application to authorize a user that has been previously authorized.

We now turn to method 1300 in FIG. 13 to see what happens when a user requests access to a second application (530 in FIG. 5) when the user has already been authorized (e.g., as shown in method 1200 in FIG. 12). Method 1300 begins when the same user requests access to the second application 530 via browser 310 during the same user session (step 1310). The application queries the authorization mechanism to determine if the user is authorized (step 1320), preferably by invoking the verify function. The authorization mechanism determines from the authorization mechanism stored in the trusted section of the global data cache that the user is already authorized (step 1330). The authorization mechanism then sends a message in response to the invocation of the verify function that indicates that the user is authorized (step 1340). The second application then allows the user access (step 1350).

Figure 14:
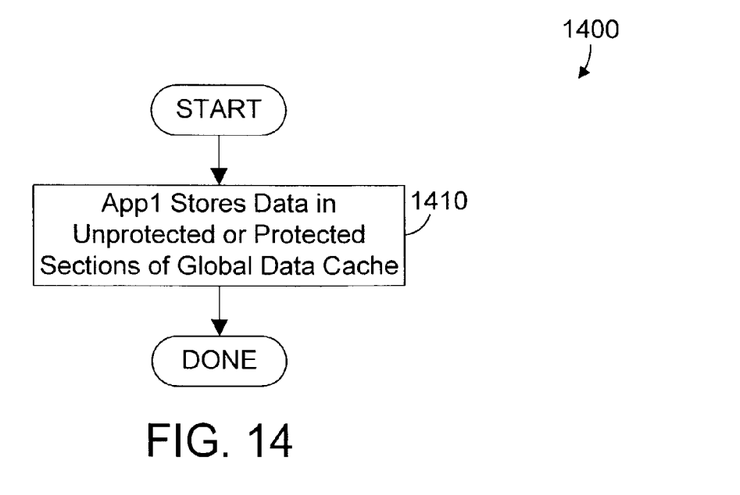
FIG. 14 is a flow diagram of a method in accordance with the preferred embodiments for a first software application to store data in the global data cache.

Method 1400 in FIG. 14 shows how an application may store data in the unprotected or protected sections of the global data cache (step 1410). In the preferred embodiments, data corresponding to a user session is stored as an object. Applications request the data in the object using an extensible markup language (XML) interface. This allows applications to access the global data cache regardless of operating system, platform, or programming language. If an application usually prompts the user for twelve fields of information, and data for eight of the twelve fields already exists in the user's object in the global data cache, the application can retrieve the data from the user's object in the global data cache, and can either prompt the user for only the missing data, or prompt the user for all of the data, with the data values already filled in for data that is know from the object stored in the global data cache. Of course, there are other numerous ways of storing data besides in an object, all of which are within the scope of the preferred embodiments.

Figure 15:
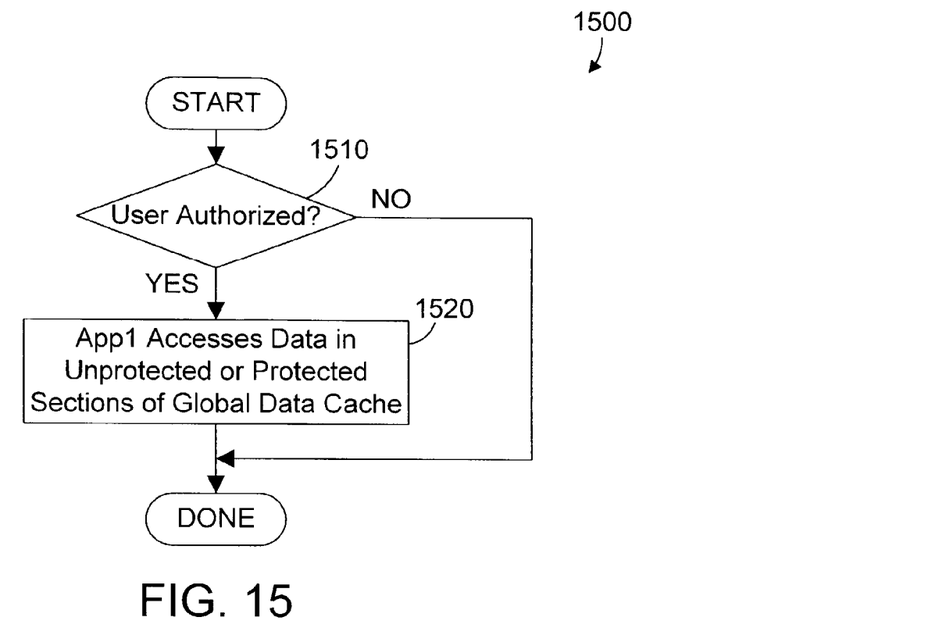
FIG. 15 is a flow diagram of a method in accordance with the preferred embodiments for a second software application to access data in the global data cache.

Method 1500 in FIG. 15 shows how an application may access data in the unprotected or protected sections of the global data cache. If the user is not authorized (step 1510=NO), access to the data is denied. If the user is authorized (step 1510=YES), the application is allowed to access the data in the unprotected or protected sections of the global data cache (step 1520). Determining whether the user is authorized in step 1510 involves determining whether the requested data is in the trusted section, the protected section or the unprotected section. A method for accessing data in the trusted section of the global data cache is shown as method 900 of FIG. 9. A method for accessing data in the protected section of the global data cache is shown as method 1000 of FIG. 10. A method for accessing data in the unprotected section of the global data cache is shown as method 1100 of FIG. 11. Note that these methods 900, 1000 and 1100 preferably use different criteria for protecting access to their respective trusted, protected and unprotected sections of the global data cache.

Figure 16:
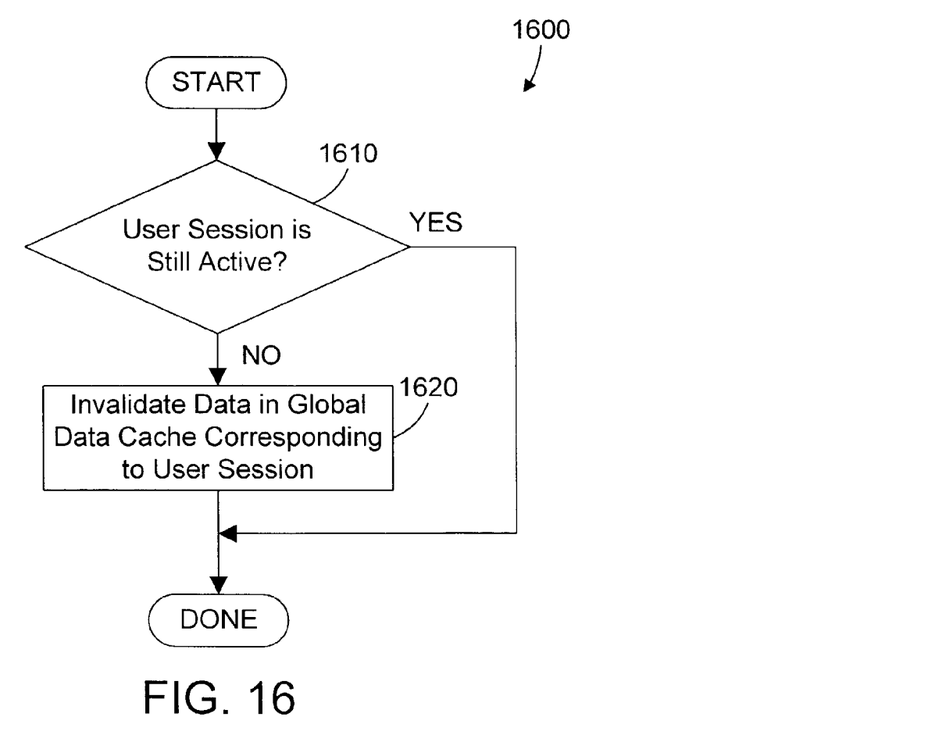
FIG. 16 is a flow diagram of a method for invalidating data in the global data cache corresponding to a user session when the user session terminates.

One significant feature of the preferred embodiments is that data in the global data cache is only valid during a user session. Thus, when a user session terminates, the data in the global data cache corresponding to the user session is invalidated. Referring to FIG. 16, method 1600 first determines if the user session is still active (step 1610). If so (step 1610=YES), the corresponding data in the global data cache is maintained. Once the user session is no longer active (step 1610=NO), the data corresponding to the user session in the global data cache is invalidated (step 1620). Note that there may be many users that have active sessions, and that each of these users may store data in the global data cache. When a user session is no longer active (step 1610=NO), only the data corresponding to that user session is invalidated in step 1620.

There may be many different mechanisms for invalidating the data in the global data cache that corresponds to a user session. One way is to provide an active monitor that determines when a user session terminates, and that deletes or otherwise invalidates the corresponding data for the user session in the global data cache. Another way is to provide a background process that performs garbage collection functions, and that determines from a timer when a user session is no longer active. The timer could be an absolute timer that only allows the user to continue the user session for a preset period of time, or could be a retriggerable timer that is retriggered each time the user performs some predefined task. In the latter example, the user can keep a session active so long as the user is actively working during the session. Yet another way to invalidate the data in the global data cache is for the application server 550 to invalidate the session.

When the timer for a user session times out, the corresponding data in the global data cache may be invalidated, thereby requiring a user to log on again. Yet another way to invalidate user session data in the global data cache is to provide an authorization token to the user that includes a timeout value, and when the timeout value is exceeded, the user session is terminated. A typical timeout value for a user session could be ten minutes, could be an hour, or could be a day depending on the specific applications being executed and the environment in which they are executed. The preferred embodiments expressly extend to any suitable timeout value, or to no timeout value at all. In other words, a user session could remain active until the user manually logs off, or a timer could be used (as discussed above) that keeps the user session active so long as the user performs work within predefined time limits, which causes the browser to invoke the keep alive ping function of the common session manager to keep the user's session active. By invalidating data in the global data cache that corresponds to an expired user session, the memory in the global data cache may be more efficiently used for other user sessions. Note that there may be some time delay between the termination or expiration of a user session and the invalidation of the corresponding user session data in the global data cache. The timing between the termination and expiration of a session and the invalidation of data in the global data cache in unimportant. What is significant is that, at some point after the user session terminates, the corresponding data in the global data cache for the user session will be invalidated, thereby freeing up that portion of the global data cache for reuse by another user session.

Because the global data cache stores authorization information for a user session, the user session may be limited to a predetermined time period or a predetermined inactive time period to force the user to re-authorize periodically to assure that the user's authorization is still current. Requiring a user to enter his or her authorization information every hour or two is a minor inconvenience that can enhance the security of the system by assuring that a user cannot continue a session after his or her authorization information has been invalidated.

The preferred embodiments provide an easy and efficient way to provide both single sign-on capability and the ability to easily share data between software applications during a user session. Once the user session terminates, the data in the global data cache corresponding to the user session is invalidated. The authorization mechanism provides the interface for single sign-on capability. The common session manager provides the interface for sharing data between applications. Data stored in the global data cache is protected to different degrees depending on whether the data is stored in the trusted section, the protected section, or the unprotected section. The preferred embodiments thus provide a simple and elegant solution to both authorization and data sharing between applications on a computer network.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A method for sharing data between first and second software applications during a user session, the method comprising the steps of:
   a user providing authorization data to the first software application;
   the first software application storing the authorization data in a trusted section of the global data cache, the first software application storing application data in at least one of a protected section and an unprotected section of the global data cache;
   the second software application requesting verification that the user is authorized to access the second software application;
   reading the authorization data from the trusted area of the global data cache;
   determining from the read authorization data whether the user is authorized to access the second software application;
   if the user is authorized to access the second software application, allowing the user to access the second software application;
   if the user is not authorized to access the data in the global data cache, denying the user access to the second software application; and
   invalidating the data in the global data cache corresponding to the user session after the user session terminates.

2. The method of claim 1 wherein the user is authorized to access the protected section of the global data cache if the user has previously supplied authorization information corresponding to the data stored in the protected section.

3. The method of claim 1 wherein the user is authorized to access the unprotected section of the global data cache if the user has a valid session identifier.

* * * * *